(12) United States Patent
Zhuo et al.

(10) Patent No.: US 12,481,553 B2
(45) Date of Patent: Nov. 25, 2025

(54) SYSTEM, METHOD AND APPARATUS FOR REDUCING POWER CONSUMPTION OF ERROR CORRECTION CODING USING COMPACTED DATA BLOCKS

(71) Applicant: INTEL CORPORATION, Santa Clara, CA (US)

(72) Inventors: Qiuxu Zhuo, Shanghai (CN); Karthik Ananthanarayanan, Milpitas, CA (US); Hsing-Min Chen, Santa Clara, CA (US); John Holm, Beaverton, OR (US); Anthony Luck, San Jose, CA (US)

(73) Assignee: Intel Corportation, Santa Clara, CA (US)

( * ) Notice: Subject to any disclaimer, the term of this patent is extended or adjusted under 35 U.S.C. 154(b) by 0 days.

(21) Appl. No.: 18/572,226

(22) PCT Filed: Dec. 17, 2021

(86) PCT No.: PCT/CN2021/139082
§ 371 (c)(1),
(2) Date: Dec. 20, 2023

(87) PCT Pub. No.: WO2023/108600
PCT Pub. Date: Jun. 22, 2023

(65) Prior Publication Data
US 2024/0289213 A1 Aug. 29, 2024

(51) Int. Cl.
*G06F 11/10* (2006.01)
(52) U.S. Cl.
CPC ............... *G06F 11/1048* (2013.01)

(58) Field of Classification Search
CPC .................................................. G06F 11/1048
See application file for complete search history.

(56) References Cited

U.S. PATENT DOCUMENTS

| 2011/0161774 A1 | 6/2011 | Shin et al. |
| 2015/0220387 A1* | 8/2015 | Kwok ............... G06F 11/10 |
| | | 714/764 |

(Continued)

FOREIGN PATENT DOCUMENTS

| CN | 101166273 A | 4/2008 |
| CN | 110660421 A | 1/2020 |

(Continued)

OTHER PUBLICATIONS

International Searching Authority, International Search Report and Written Opinion dated Sep. 14, 2022 in International Application No. PCT/CN2021/139082 (9 pages).

(Continued)

*Primary Examiner* — Thien Nguyen
(74) *Attorney, Agent, or Firm* — Nicholson De Vos Webster & Elliott LLP

(57) ABSTRACT

In one embodiment, an apparatus comprises: a first circuit to compact a plurality of data blocks to a compacted data block and to compact a plurality of error correction codes (ECCs) associated with the plurality of data blocks to a compacted ECC; and a second circuit to generate a generated ECC for the compacted data block. The apparatus may directly send the plurality of data blocks to a destination circuit without error detection on the plurality of data blocks based at least in part on the compacted ECC and the generated ECC. Other embodiments are described and claimed.

20 Claims, 10 Drawing Sheets

(56) References Cited

U.S. PATENT DOCUMENTS

2015/0281743 A1    10/2015  Yi et al.
2021/0013903 A1*    1/2021  Vanaparthy ........ H03M 13/1102

FOREIGN PATENT DOCUMENTS

CN      112486725 A    3/2021
WO     2018052654 A1   3/2018

OTHER PUBLICATIONS

Hamming,"Error Detecting and Error Correcting Codes", Bell System Technical Journal, vol. 29, No. 2, Apr. 1950, pp. 147-160.
Ghosh et al."Reducing Power Consumption in Memory ECC Checkers," 2004 International Conferce on Test. IEEE, 2004.
Ye et al. "Power consumption in XOR-based circuits," Proceedings of the ASP-DAC'99 Asia and South Pacific Design Automation Conference 1999 (Cat. No. 99EX198), IEEE, 1999.
Hsiao, "A Class of Optimal Minimum Odd-weight-column SEC-DED Codes", IBM Journal of Research and Development, vol. 14, No. 4, Jul. 1970, pp. 395-401.

* cited by examiner

SYSTEM, METHOD AND APPARATUS FOR REDUCING POWER CONSUMPTION OF ERROR CORRECTION CODING USING COMPACTED DATA BLOCKS

BACKGROUND

Many computing systems, including cloud servers, electronic consumer products and communication systems, rely on error correction coding (ECC) to detect and correct data corruption in memory, to enhance system reliability and data integrity. But this ECC-supporting memory contributes to additional power consumption due to redundant ECC generations for error detections/corrections.

As an example, when reading a data block associated with a stored ECC (generated on a prior write of the data block to the memory), a new ECC is generated and compared with the stored ECC to perform error detection/correction. For every read operation, even when there are no errors in the data, these operations are performed. As such, the latency and power consumption of these operations are incurred, whether errors are present or not.

DETAILED DESCRIPTION

In various embodiments, power consumption in computing systems may be reduced during data transmission and/or memory read operations by avoiding error correction coding (ECC) checking on individual data blocks when it can be established that there are no errors in the data blocks. To this end, embodiments may perform compaction of multiple data blocks and corresponding ECC information. Then based on the compacted data block and a generated ECC, it can be determined whether any errors are present in the underlying data blocks (without actually performing ECC checking and/or further error detection on the individual data blocks). If not, the power consumption and latency of performing ECC checking on these data blocks can be avoided and the underlying data blocks can be directly sent to a destination circuit. Only in the infrequent case of identifying an error will ECC checking be performed on one or more individual data blocks.

Embodiments may leverage the fact that in most cases, there are no errors in the memory and thus data read from the memory does not have any errors. Thus conventional ECC operations performed, e.g., by a memory controller on a read path, can often be unneeded and unnecessarily consume power and increase latency. With embodiments, data read path circuitry may be configured to perform a modified ECC check (maintaining the ECC-protection ability) while substantially reducing power consumption. In some cases, a power reduction of up to ~75% may be realized for an ECC check in accordance with an embodiment.

The characteristics of typical ECC schemes, e.g., a Hamming code scheme or a Hsiao code scheme, enables compaction of N X-bit data blocks (each with a Y-bit ECC) to a new X-bit data block having a Y-bit ECC. This data compaction may be performed in one or more examples by applying bitwise-exclusive-OR (XOR) operations on the underlying N data blocks and their ECCs for a plurality (N−1) of iterations.

Next, a rapid determination may be made as to whether an error occurs in the original N data blocks by determining whether an error occurs in the compacted new data block. If not, this means that there is no error in the original N data blocks. In this case, the N data blocks may be directly sent to a destination circuit (e.g., a consumer such as a core) via a so-called hot path or bypass path. Instead, if an error is identified in the compacted data block, this means that there is an error in the original N data blocks. In this case, individual ECC generations and error detections/corrections may be performed for each original data block. Note however, that this error identification in the compacted case (and the underlying data) is a rare case, a cold path that does not frequently occur.

Thus according to one or more examples, rather than generating ECCs for the original N data blocks N times, a single ECC may be generated for the compacted data block to quickly determine whether an error occurred in the original N data blocks.

Figure 1:
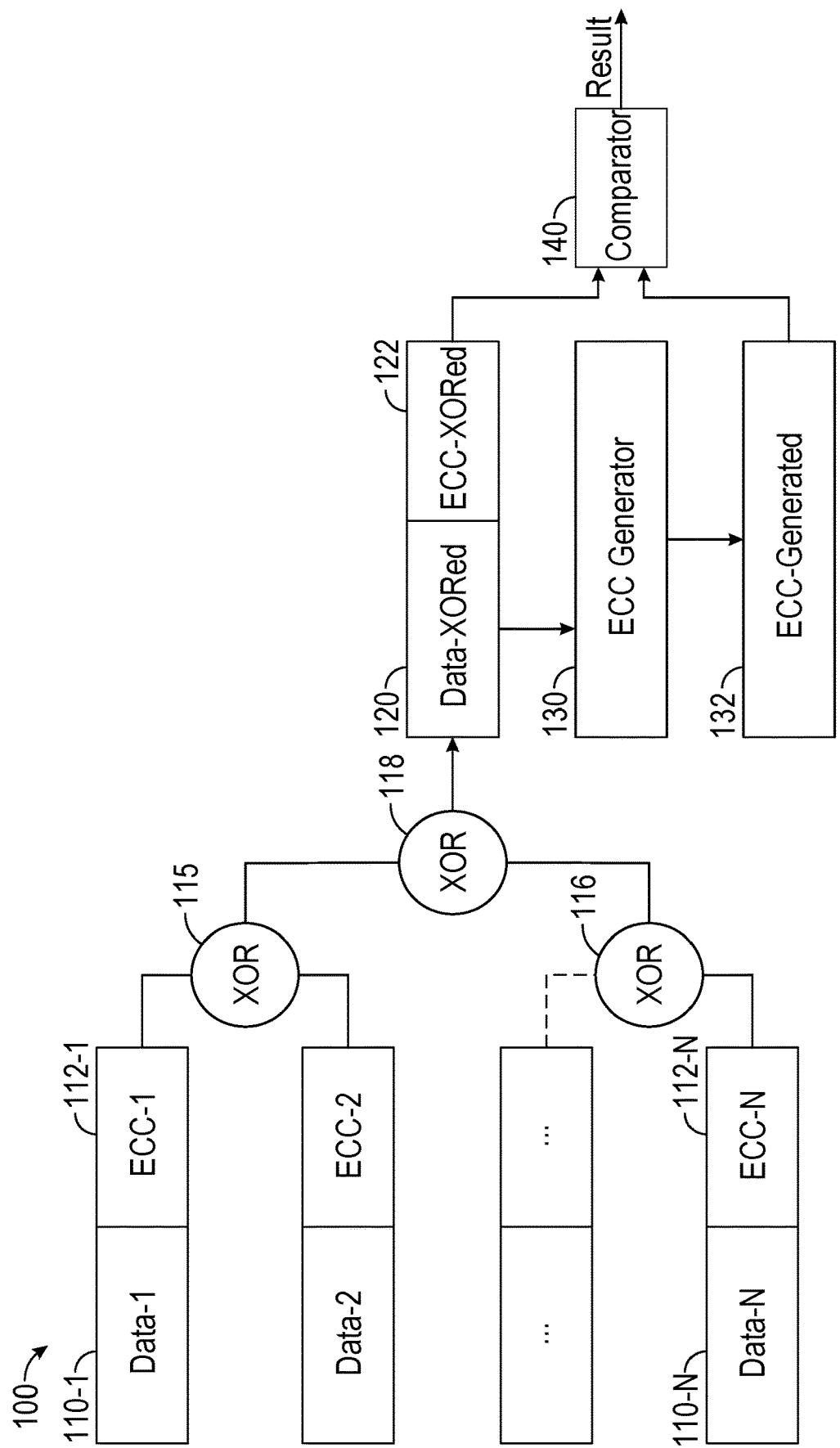
FIG. 1 is a block diagram of a data path of read circuitry according to an example implementation.

Referring now to FIG. 1, shown is a block diagram of a data path of at least a portion of read circuitry in accordance with an embodiment. In the high level view shown in FIG. 1, read circuitry 100 may be included within a memory controller; of course this read circuitry may be otherwise located in different embodiments. For example, this circuitry may be present within interface circuitry for an embodiment in which the ECC techniques described herein are used for data communication protection between a sender and a receiver.

As illustrated, read circuitry 100 receives a plurality of incoming data blocks with corresponding ECCs. More specifically as shown, in response to a read request, data blocks 110-1-110-N and corresponding ECCs 112-1-112-N are received. Pairs of these data blocks are provided to corresponding XOR circuits 115, 116 where bitwise-XOR operations may be performed between corresponding bits of the pairs of data blocks 110 and ECCs 112. In the high level view shown in FIG. 1, two first-level XOR circuits 115, 116 are shown. Depending upon the number of incoming data blocks, more (or fewer) XORs may be present. The XOR results are in turn provided to a second-level XOR 118, which performs another bitwise XOR of the XOR results to generate a compacted data block 120 (Data-XORed) and a compacted ECC 122 (ECC-XORed). In other embodiments additional XOR levels may be present.

Still referring to FIG. 1, compacted data block 120 may be provided to an ECC generator 130, which generates an ECC 132 for this compacted data block (ECC-Generated). In one or more examples, ECC generator 130 may include hardware circuitry having multiple XOR gates configured to perform bitwise-XOR operations.

Generated ECC 132 and compacted ECC 122 are provided to a comparator 140, which may perform a bitwise comparison to determine whether the values match. If so, it is determined that no error exists in any of underlying data blocks 110. Accordingly, these data blocks may be provided directly to a destination circuit (e.g., directly to a core or other requester of data and/or a cache memory) without performing ECC checking or other error detection on the individual data blocks. Instead if an error is identified, one or more of data blocks 110 may be provided to error detection and/or correction circuitry.

Thus in FIG. 1, N X-bit data blocks 110 are compacted together with their Y-bit ECCs 112 (generated on a previous write) to a new X-bit data block 120 (Data-XORed) and the associated Y-bit ECC 122 (ECC-XORed), by applying bitwise-XOR operations on the N data blocks and their ECCs N−1 times. Assuming no errors, the value of ECC-XORed is identical to the ECC for Data-XORed, i.e., ECC-XORed=ECC-Generated. A proof of this Equation is shown below in Appendix A. Embodiments can leverage this characteristic that "ECC-XORed=ECC-Generated" to quickly determine whether error(s) occurred in the original N data blocks. While shown at this high level in the embodiment of FIG. 1, many variations and alternatives are possible.

Figure 2:
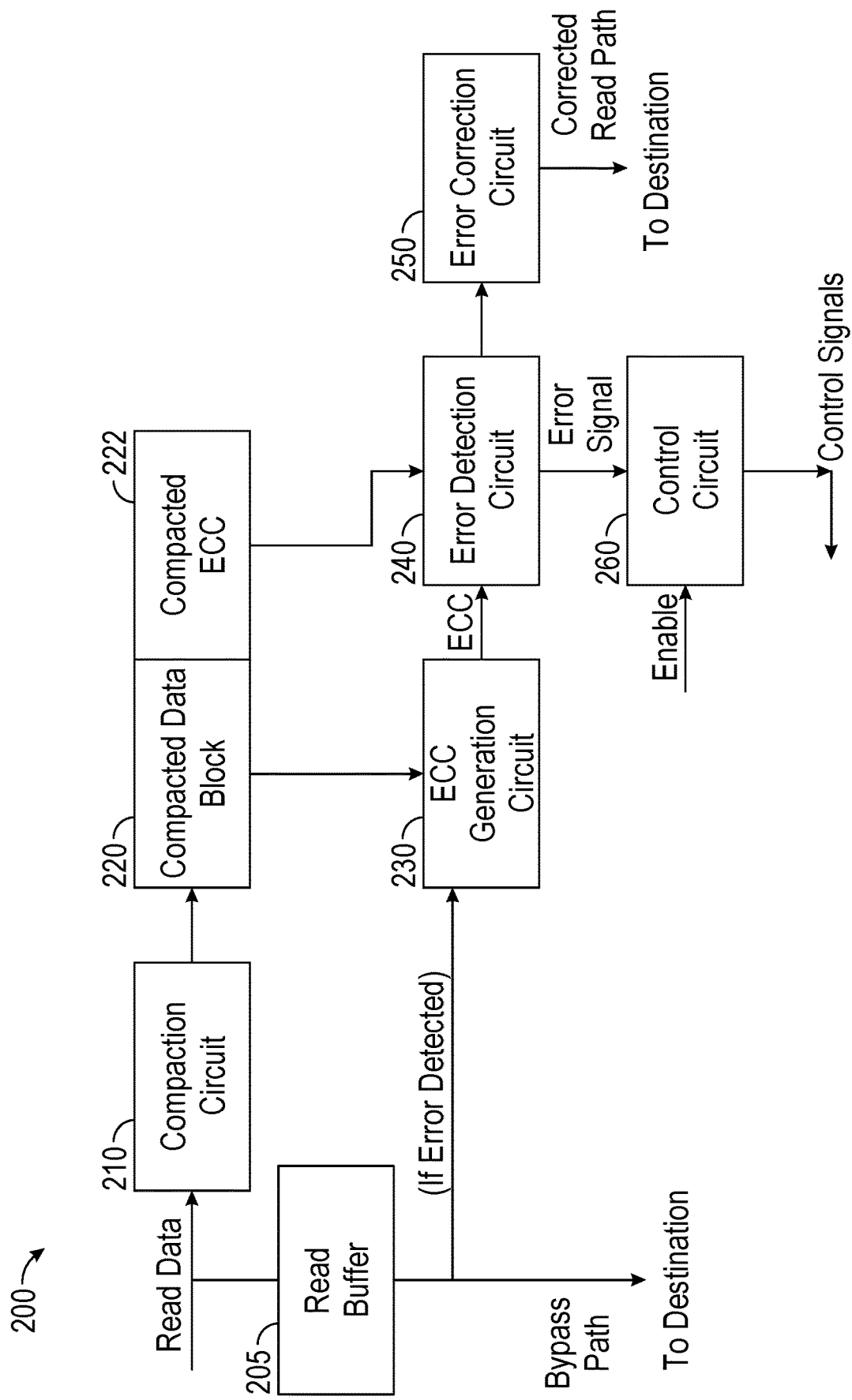
FIG. 2 is a block diagram of a portion of a memory controller according to an example implementation.

Referring now to FIG. 2, shown is a block diagram of a portion of a memory controller 200 in accordance with an embodiment. In the high level view shown in FIG. 2, relevant read circuitry of memory controller 200 is shown to illustrate an implementation. Of course memory controller 200 may include additional circuitry for performing further operations for memory reads as well as memory writes, and so forth.

As illustrated, incoming read data (which may be read from a memory) is provided to a compaction circuit 210 and a read buffer 205, which may buffer the individual data blocks. Compaction circuit 210 may include XOR circuitry such as shown in FIG. 1 (and potentially including additional XOR levels) to compact N data blocks into a compacted data block, e.g., using bitwise-XOR operations as discussed above. Note that the read data may include, in addition to multiple data blocks, corresponding ECCs for each data block, which also may be compacted in compaction circuit 210. As such, compaction circuit 210 outputs a compacted data block 220 and a compacted ECC 222.

Compacted data block 220 is provided to an ECC generation circuit 230 which generates an ECC for this compacted data block that in turn is provided to an error detection circuit 240. Error detection circuit 240 also may receive compacted ECC 222. Error detection circuit 240 may compare these values and identify an error if the values differ. In this instance, error detection circuit 240 may output an error signal to a control circuit 260. Control circuit 260 may, in response to this error signal, cause ECC generation circuit 230 and error detection circuit 240 (and potentially an error correction circuit 250) to perform ECC checking, error detection and/or correction on the received read data (obtained from read buffer 205). Otherwise when no error is detected as shown, read data may be directly provided to a destination circuit via a bypass path, avoiding the need for ECC checking on individual data blocks. In some embodiments, control circuit 260 may cause the data to be directly provided to the destination based on the comparison performed in error detection circuit 240.

As also shown, control circuit 260 may receive control information such as an enable indicator to indicate whether the compaction-based ECC techniques described herein are to be enabled. As one example, this feature can be enabled or disabled, e.g., based on a basic input output system (BIOS) setting. In turn, this setting may be stored in a configuration storage (e.g., a given configuration register) as an enable indicator, which when set, enables the feature and when reset, disables the feature. In this example, a BIOS setup menu may provide a user the ability to enable or disable the energy-efficient ECC check path techniques described herein. In some cases, statically or dynamically, operation may be controlled for a first mode in which the techniques are enabled, or a second mode in which the techniques are disabled. Also note that in some cases techniques in accordance with embodiments may be used for data-only, command/address-only, or all information.

When an error is detected in one or more of the underlying data blocks, error correction circuit 250 may attempt to correct the error (e.g., a single bit error). When successful, error correction circuit 250 may output the corrected read data to the destination. Other error handling may occur if this error correction is unsuccessful. Note that with embodiments, this ECC generation, checking and error correction can be avoided for the vast of the majority of incoming reads when it is identified that there are no underlying errors, by way of compacting the data blocks and their corresponding ECCs, reducing power consumption and latency for the vast majority of read operations. Understand while shown at this high level in the embodiment of FIG. 2, many variations and alternatives are possible.

Figure 3:
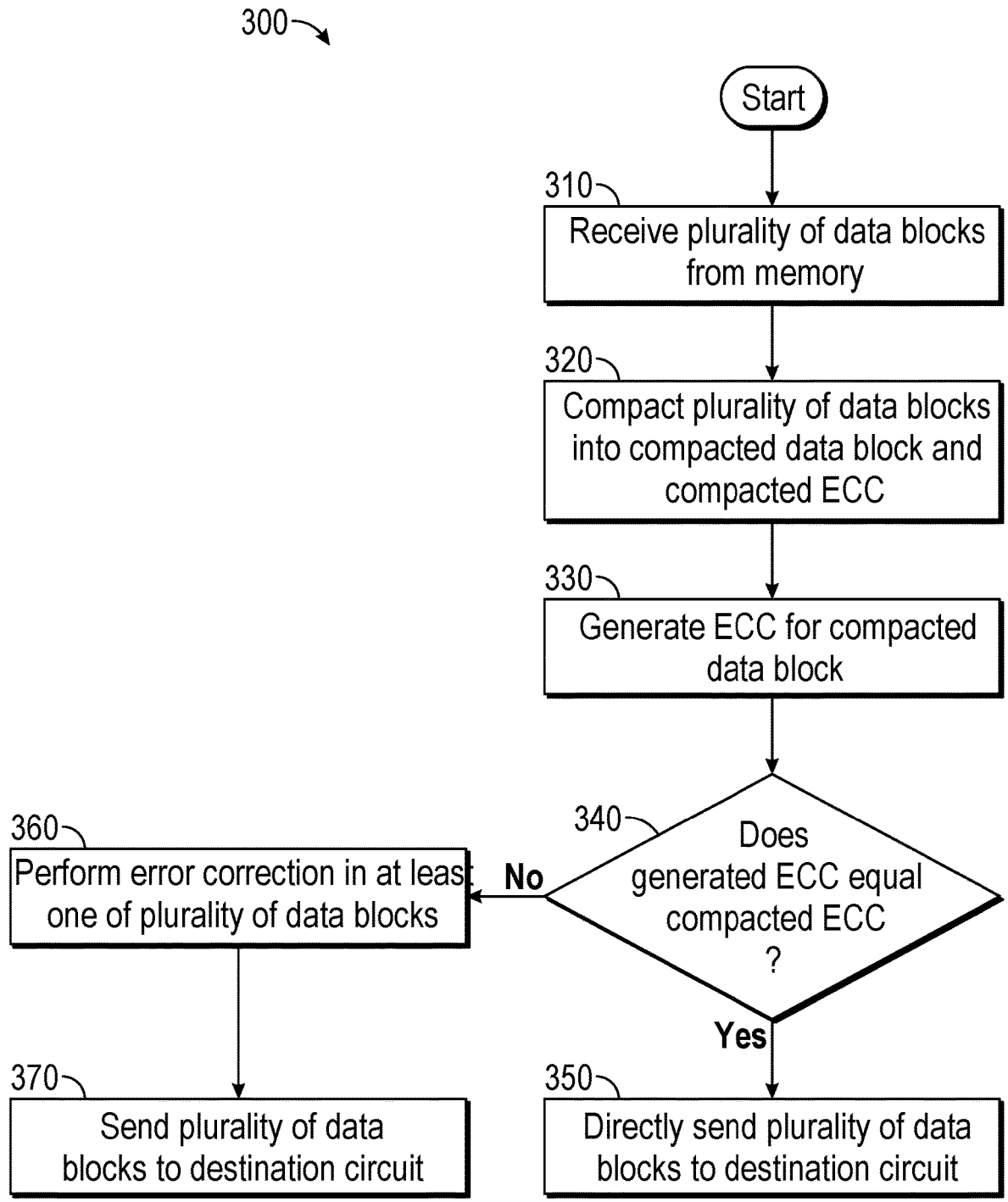
FIG. 3 is a flow diagram of a method according to an example implementation.

Referring now to FIG. 3, shown is a flow diagram of a method in accordance with an embodiment. As shown in FIG. 3, method 300 is a method for performing ECC checking with reduced power consumption and latency. In one or more examples, method 300 may be performed by memory controller circuitry which may be implemented as a hardware circuit. In some implementations, this memory controller circuitry may execute firmware and/or software as part of method 300.

As illustrated, method 300 begins by receiving a plurality of data blocks from a memory (block 310). These data blocks may be received in response to a read return for a given read request. At block 320 these data blocks may be compacted into a compacted data block. In addition, corresponding ECCs for these individual data blocks may be compacted into a compacted ECC. Then at block 330, an ECC may be generated for the compacted data block.

Still with reference to FIG. 3, next at diamond 340 it may be determined whether the two ECCs equal each other. In an embodiment, identifying a mismatch between the generated ECC and the compacted ECC may identify presence of an error. If no error is detected (i.e., the two ECCs are equal), control passes to block 350 where the data blocks may be directly sent to a destination circuit such as a cache memory and/or core, without performing any ECC checking or other error detection of these underlying data blocks.

Still with reference to FIG. 3, instead if it is determined that an error is detected (i.e., the two ECCs do not match), control passes to block 360 where error correction may be performed in at least one of the data blocks. This error correction may include performing ECC checks, identifying a location of an error, and then correcting the error. Assuming that the error correction is successful, at block 370, the data blocks may be sent to the destination circuit. Note that if the error correction is not successful, some form of error handling such as logging the address of the error and signaling a machine check may be performed.

In contrast to the optimized flow of in FIG. 3, a conventional ECC check would require N times of ECC generations and error detections/corrections for N received data blocks, which is time consuming and power-consuming. Instead with embodiments, most of the time, because there are no memory data errors, there is only a single ECC generation and error detection performed for the compacted data block. Assuming no error is found, the N data blocks may be sent to a destination circuit via a hot path (from diamond 340 to block 350), which is much faster and energy-efficient. Understand while shown at this high level in the embodiment of FIG. 3, many variations and alternatives are possible.

Figure 4:
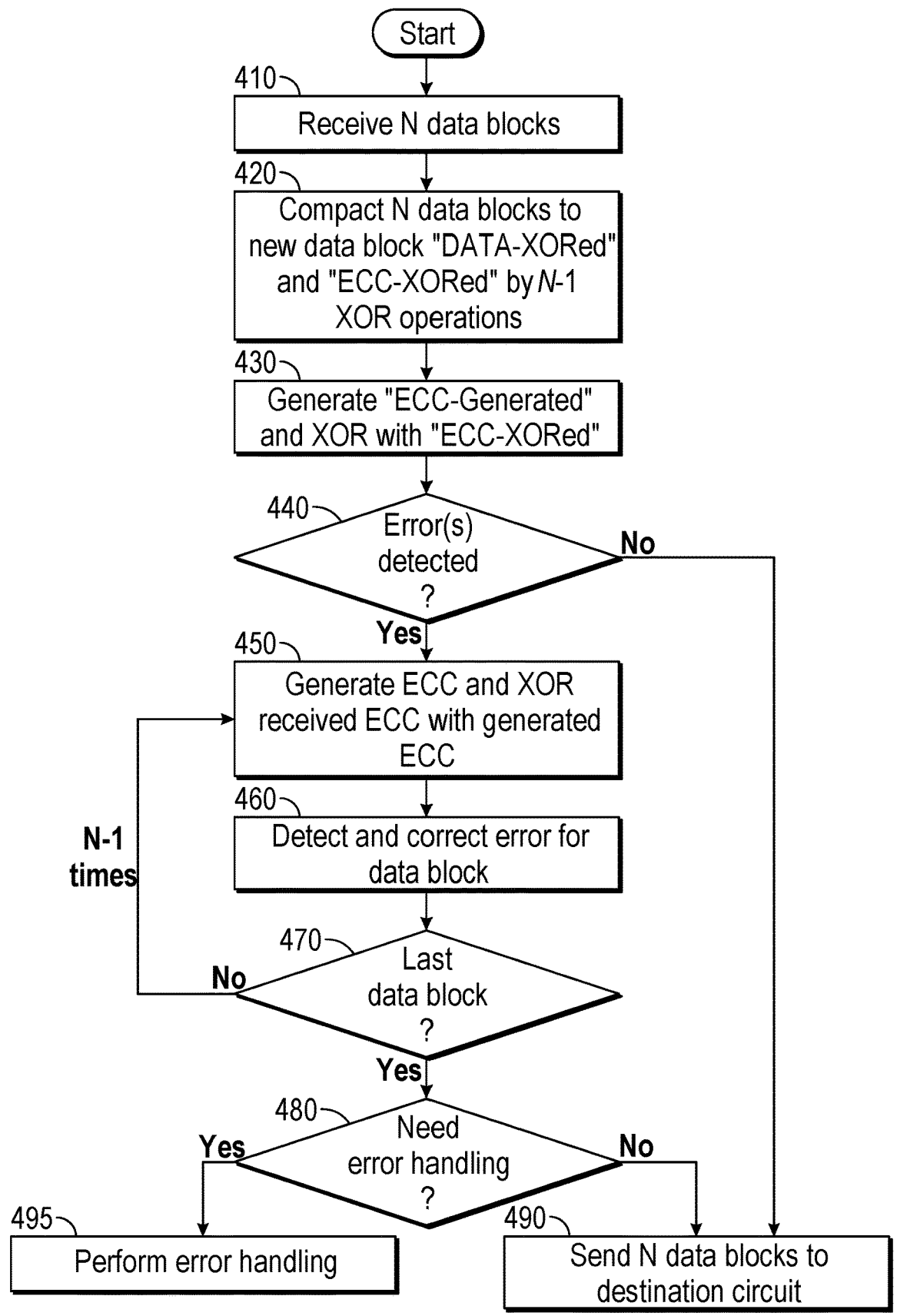
FIG. 4 is a flow diagram of another method according to an example implementation.

Referring now to FIG. 4, shown is a flow diagram of a method in accordance with another embodiment. More particularly, method 400 is a more detailed method for ECC checking with reduced power consumption and latency that may be performed, e.g., by memory controller circuitry.

Method 400 begins by receiving N data blocks (block 410). Next at block 420 these N data blocks may be compacted to a new data block (Data-XORed). In an embodiment N−1 XOR operations may be performed to generate this compacted data block. In addition, corresponding ECCs for the data blocks may be compacted as well using N−1 XOR operations to result in a compacted ECC (ECC-XORed).

Next at block 430 an ECC may be generated (ECC-Generated) from the compacted data block and can be compared to the compacted ECC (ECC-XORed), e.g., via an XOR operation. From this XOR operation it may be determined whether any errors are detected (diamond 440). If no error is detected, which may occur in the vast majority of instances, control passes directly to block 490 where the data blocks may be directly sent to a destination circuit, without performing ECC checking on the underlying data blocks. This hot path from diamond 440 to bock 490 may thus realize the power and latency savings described herein.

Instead if an error is detected, control passes to block 450 where underlying ECC generation and checking operations may be performed on the individual data blocks. More specifically as shown at block 450, an ECC may be generated for an individual data block that is then XORed with the received ECC for that data block. At block 460 any errors in that data block may be detected and corrected. Thereafter, at diamond 470, it may be determined whether this is the last data block of the group. If not, control passes back to block 450.

When all data blocks have been processed, control passes to diamond 480 to determine whether any error handling is needed (e.g., where one or more errors were not able to be corrected). If so, control passes to block 495 where error handling may be performed. Otherwise when all such errors have been corrected, the corrected data may be sent to the destination circuit (block 490). Understand while shown at this high level in the embodiment of FIG. 4, many variations and alternatives are possible.

Table 1 below shows variables used in the set of Equations below to illustrate power reduction capabilities of one or more examples.

TABLE 1

| Symbol | X | Y | R | N |
|---|---|---|---|---|
| Meaning | Data block size in bit | ECC code size in bit | The number of XORs needed to generate a Y-bit ECC code for an X-bit data block | The number of data blocks to be compacted |

Assume that an X-bit data block undergoes R times of XOR operation to generate a Y-bit ECC code. For reading N data blocks from memory, according to a conventional ECC working flow, then the number of XOR operations for ECC generations are about:

$$XORs_{old} = N * R$$

Instead using an embodiment, the number of XORs is the number of XORs to compact N data blocks to a new data block: $(N-1)*(X+Y)$ and the number of XORs to generate an ECC for the compacted data block: R.

$$XORs_{new} = (N-1)*(X+Y) + R$$

The power consumption of an XOR gate is nearly proportional to the XOR operations (signal transitions at the inputs to XOR). Comparing the power consumption of the above two techniques, the percentage of power consumption reduction $P_{reduced}$ is:

$$P_{reduced} = \frac{XORs_{old} - XORs_{new}}{XORs_{old}} * 100\%$$
$$= \frac{(N-1)*(R-X-Y)}{N*R} * 100\%$$

Please see Appendix B, where $X \cong (2R/(\log_2^X + 2))$, e.g., for a Hamming code SEC-DED (Single Error Correction, Double Error Detection) scheme. And because R is much bigger than Y, so we can drop the Y in the above equation for easy estimation, then the equation can be simplified to:

$$P_{reduced} \cong \frac{(N-1)}{N} * (1 - 2/((\log_2^X) + 2)) * 100\%$$

For fixed-size (X is fixed) data blocks, the larger N becomes, the more power consumption can be reduced. As one example, a DDR4 memory controller has a 72-bit bus, including 64-bits of data and 8-bits of ECC, so X=64. Then the above equation can be further simplified to:

$$P_{reduced} \cong \frac{(N-1)}{N} * 0.75 * 100\%$$

To read a typical 64-byte cache line, 8 blocks of 64-bit data are read, so N=8. In this case, the power consumption is reduced by about: (8−1)/8*0.75*100%=66%.

Note that for different values of N, different amounts of power consumption may be conserved. For example for 64-bit data blocks, power consumption may be reduced sharply just at the first small values of N. For example power may be reduced by ~40% for N=2 and by ~50% for N=3. As such, for various use cases, a small value of N can achieve good power reduction. In some cases, an upper bound of power reduction may be ~75%, due to the compaction operations.

Figure 5A:
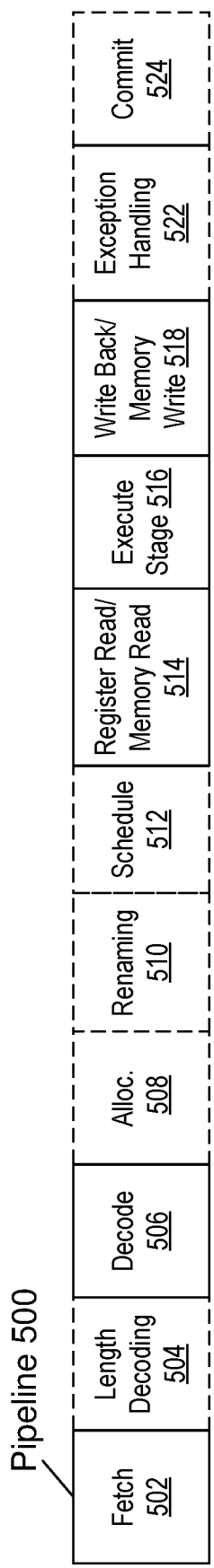
FIG. 5A is a block diagram illustrating both an exemplary in-order pipeline and an exemplary register renaming, out-of-order issue/execution pipeline according to embodiments of the invention.
Figure 5B:
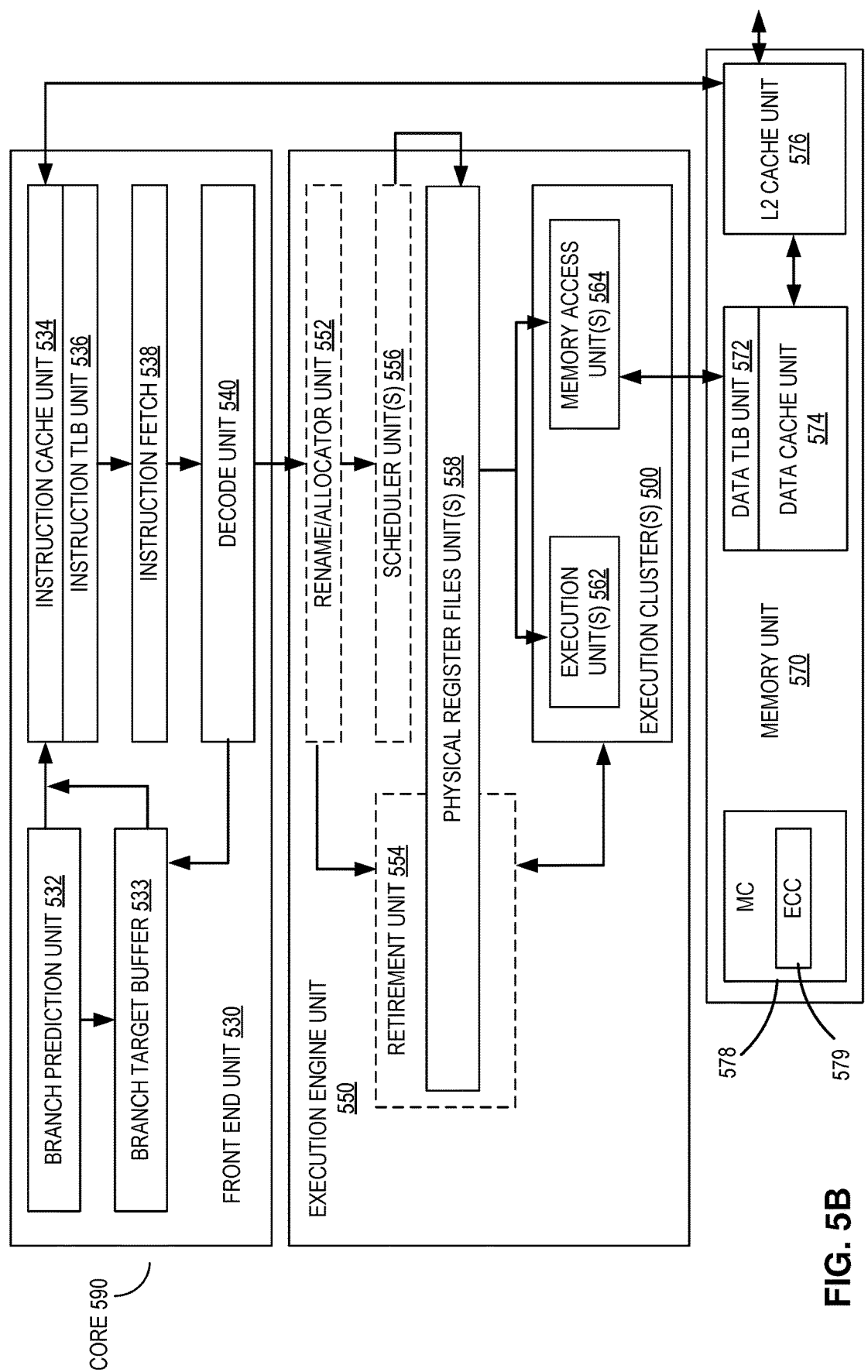
FIG. 5B is a block diagram illustrating both an exemplary embodiment of an in-order architecture core and an exemplary register renaming, out-of-order issue/execution architecture core to be included in a processor according to embodiments of the invention.

Embodiments may be used in connection with many different processor architectures. FIG. 5A is a block diagram illustrating both an exemplary in-order pipeline and an exemplary register renaming, out-of-order issue/execution pipeline according to embodiments of the invention. FIG. 5B is a block diagram illustrating both an exemplary embodiment of an in-order architecture core and an exemplary register renaming, out-of-order issue/execution architecture core to be included in a processor according to embodiments of the invention. Such embodiments may include memory controller circuitry having error detection and correction circuitry as described herein. The solid lined boxes in FIGS. 5A and 5B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 5A, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. Note that as described herein, in a given embodiment a core may include multiple processing pipelines such as pipeline 500.

FIG. 5B shows processor core 590 including a front end unit 530 coupled to an execution engine unit 550, and both are coupled to a memory unit 570. The core 590 may be a reduced instruction set computing (RISC) core, a complex instruction set computing (CISC) core, a very long instruction word (VLIW) core, or a hybrid or alternative core type. As yet another option, the core 590 may be a special-purpose core, such as, for example, a network or communication core, compression engine, coprocessor core, general purpose computing graphics processing unit (GPGPU) core, graphics core, or the like.

The front end unit 530 includes a branch prediction unit 532 coupled to a branch target buffer 533 and an instruction cache unit 534, which is coupled to an instruction translation lookaside buffer (TLB) 536, which is coupled to an instruction fetch unit 538, which is coupled to a decode unit 540. The decode unit 540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 590 includes a microcode ROM or other medium that stores microcode for certain macroinstructions (e.g., in decode unit 540 or otherwise within the front end unit 530). The decode unit 540 is coupled to a rename/allocator unit 552 in the execution engine unit 550.

As further shown in FIG. 5B, the execution engine unit 550 includes the rename/allocator unit 552 coupled to a retirement unit 554 and a set of one or more scheduler unit(s) 556. The scheduler unit(s) 556 represents any number of different schedulers, including reservations stations, central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 558 comprises a vector registers unit, a write mask registers unit, and a scalar registers unit. These register units may provide architectural vector registers, vector mask registers, and general purpose registers. The physical register file(s) unit(s) 558 is overlapped by the retirement unit 554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which includes a data TLB unit 572 coupled to a data cache unit 574 coupled to a level 2 (L2) cache unit 576, and further includes a memory controller 578. In one exemplary embodiment, the memory access units 564 may include a load unit, a store address unit, and a store data unit, each of which is coupled to the data TLB unit 572 in the memory unit 570.

As shown, the memory controller 578 may include an error detection and correction circuit 579 which may be configured to perform ECC operations on compacted data blocks as described herein. The instruction cache unit 534 is further coupled to the L2 cache unit 576 in the memory unit 570. The L2 cache unit 576 is coupled to one or more other levels of cache and eventually to a main memory.

By way of example, the exemplary register renaming, out-of-order issue/execution core architecture may implement the pipeline 500 as follows: 1) the instruction fetch 538 performs the fetch and length decoding stages 502 and 504; 2) the decode unit 540 performs the decode stage 506; 3) the rename/allocator unit 552 performs the allocation stage 508 and renaming stage 510; 4) the scheduler unit(s) 556 performs the schedule stage 512; 5) the physical register file(s) unit(s) 558 and the memory unit 570 perform the register read/memory read stage 514; the execution cluster 560 perform the execute stage 516; 6) the memory unit 570 and the physical register file(s) unit(s) 558 perform the write back/memory write stage 518; 7) various units may be involved in the exception handling stage 522; and 8) the retirement unit 554 and the physical register file(s) unit(s) 558 perform the commit stage 524.

The core 590 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 590 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 534/574 and a shared L2 cache unit 576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6:
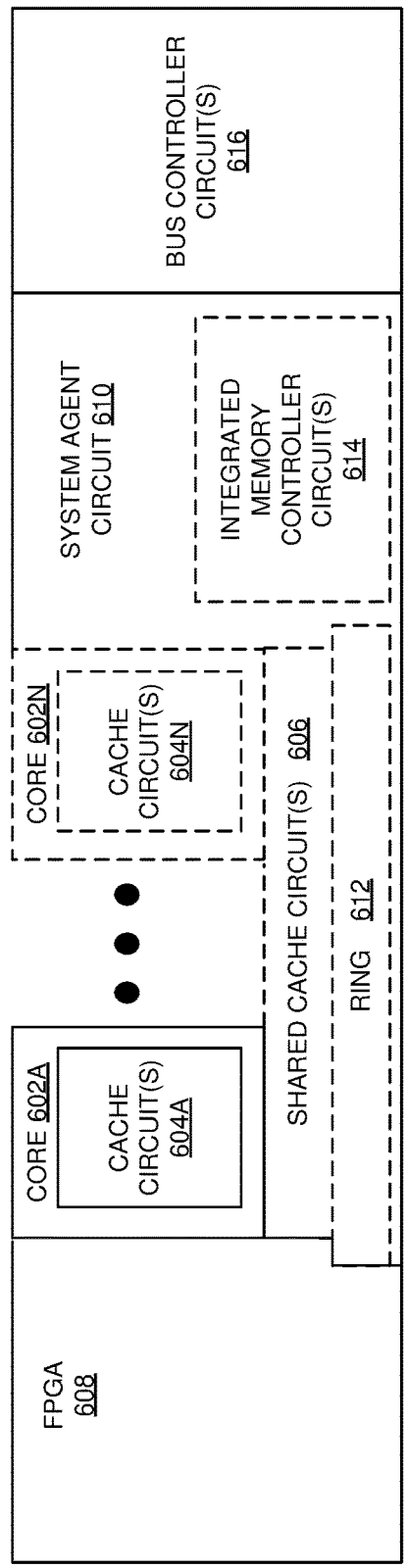
FIG. 6 is a block diagram of a processor that may have more than one core, may have an integrated memory controller, and may have integrated graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent circuit 610, a set of one or more bus controller circuits 616, while the optional addition of the dashed lined boxes illustrates an alternative processor 600 with multiple cores 602A-N, a set of one or more integrated memory controller unit(s) in the system agent circuit 610, and a special purpose logic (which may be implemented as a field programmable gate array (FPGA, as shown in FIG. 6) 608, which may perform one or more specific functions.

Thus, different implementations of the processor 600 may include: 1) a CPU with a special purpose logic being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache circuits 604A-N within the cores, a set or one or more shared cache circuits 606, and external memory (not shown) coupled to the set of integrated memory controller circuit(s) 614, which may be configured to perform ECC operations on compacted data blocks as described herein. The set of shared cache circuits 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the special purpose 608, the set of shared cache circuits 606, and the system agent circuit 610/integrated memory controller circuit(s) 614, alternative embodiments may use any number of well-known techniques for interconnecting such units.

The system agent circuit 610 includes those components coordinating and operating cores 602A-N. The system agent circuit 610 may include for example a power control unit (PCU) and a display unit. The PCU may be or include logic and components needed for regulating the power state of the cores 602A-N and the special purpose logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Figure 7:
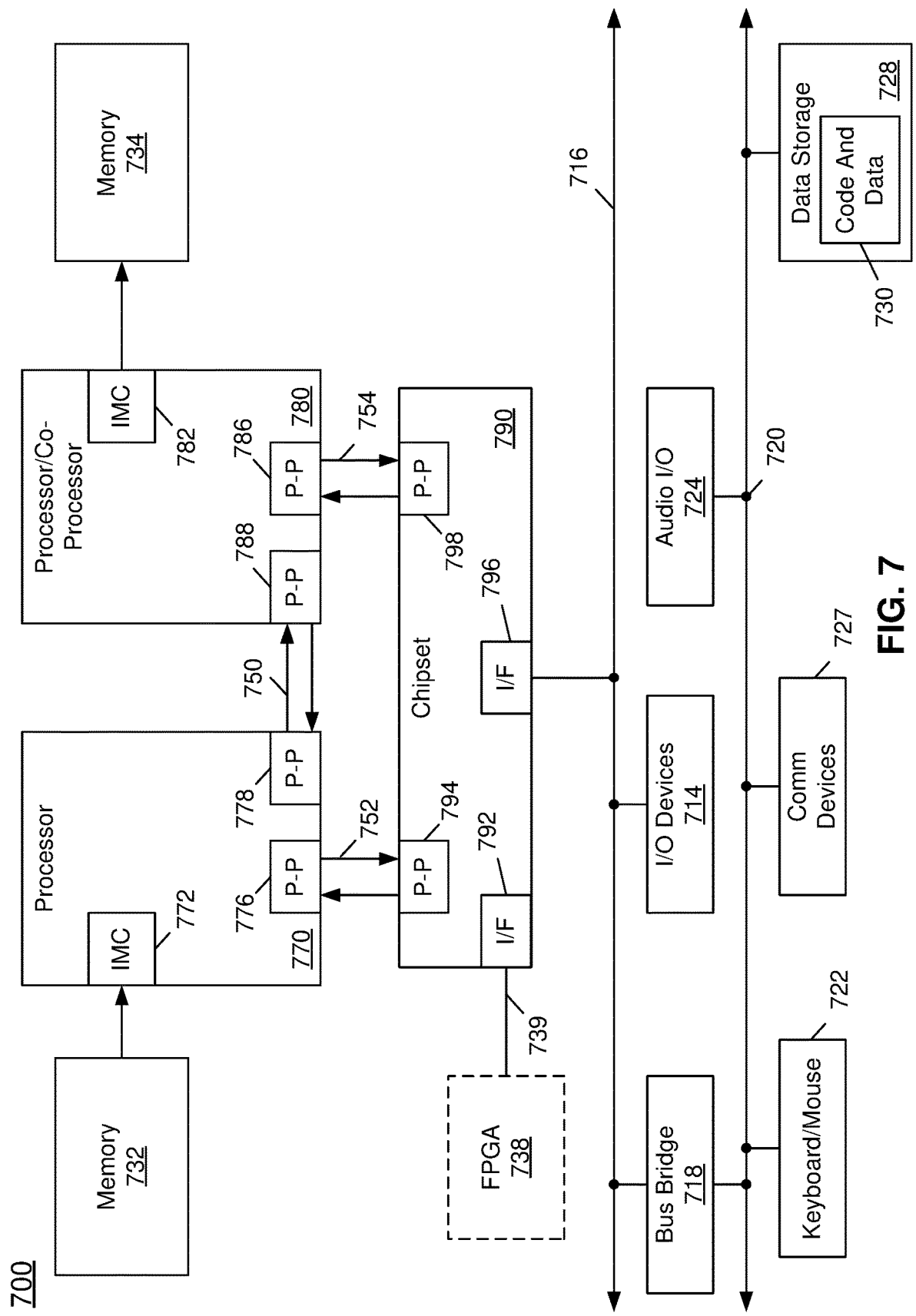
FIG. 7 is a block diagram of a first more specific exemplary system in accordance with an embodiment of the present invention.
Figure 8:
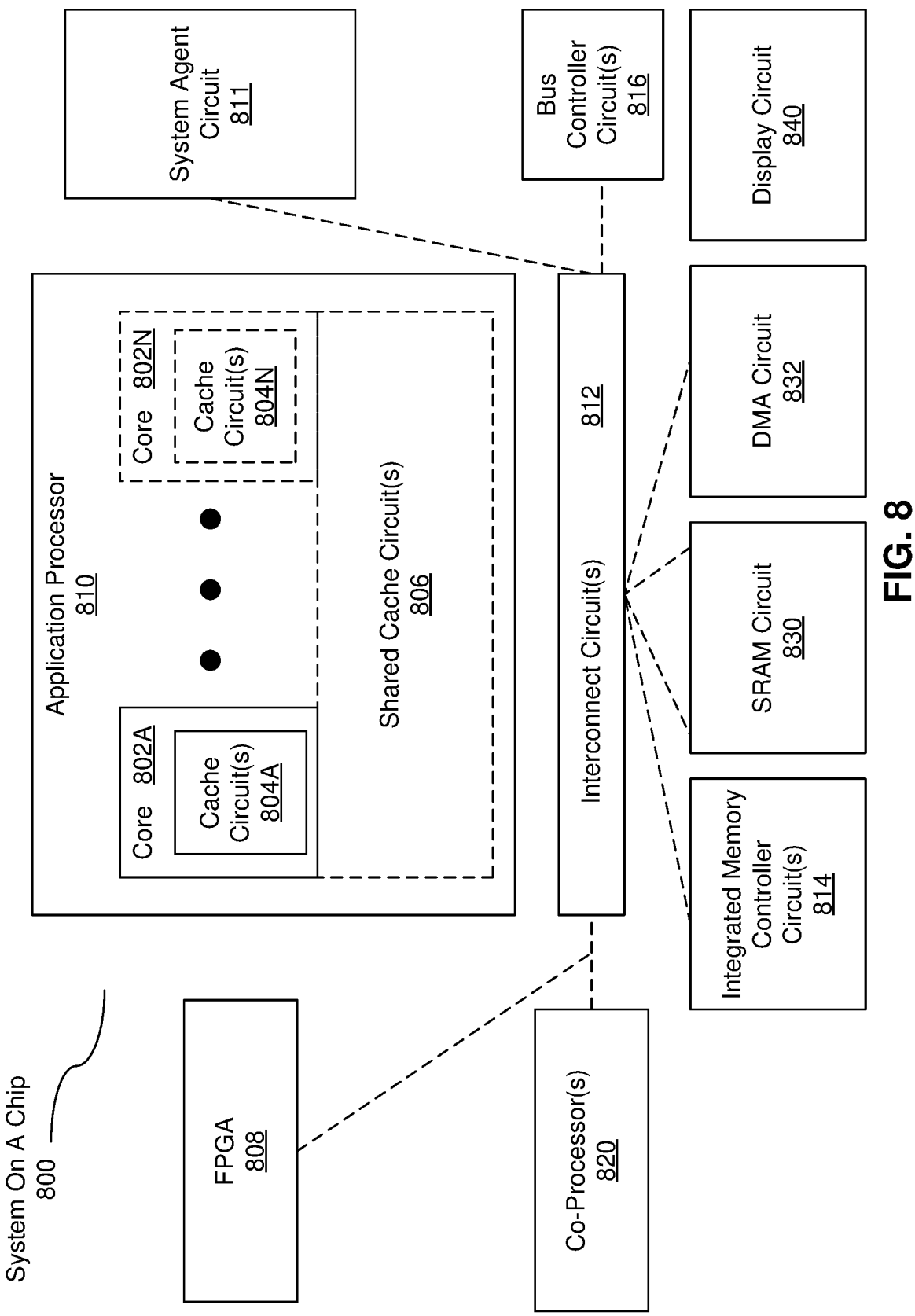
FIG. 8 is a block diagram of a SoC in accordance with an embodiment of the present invention.

FIGS. 7-8 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 7, shown is a block diagram of a first more specific exemplary system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 600.

Processors 770 and 780 are shown including integrated memory controller (IMC) units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors. In embodiments IMCs 772 and 782 may be configured to perform ECC operations on compacted data blocks as described herein.

Processors 770, 780 may each exchange information with a chipset 790 via individual P-P interfaces 752, 754 using point to point interface circuits 776, 794, 786, 798. Chipset 790 may optionally exchange information with a FPGA 738 via a high-performance interface 739. In one embodiment, the FPGA 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via a P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

Referring now to FIG. 8, shown is a block diagram of a SoC 800 in accordance with an embodiment of the present invention. Dashed lined boxes are optional features on more advanced SoCs. In FIG. 8, an interconnect circuit(s) 812 is coupled to: an application processor 810 which includes a set of one or more cores 802A-N(including constituent cache circuits 804A-N); shared cache circuit(s) 806; an FPGA 808; a system agent circuit 811; a bus controller circuit(s) 816; an integrated memory controller circuit(s) 814 (which may be configured to perform ECC operations on compacted data blocks as described herein); a set or one or more coprocessors 820 which may include integrated graphics logic, an image processor, an audio processor, and a video processor; a static random access memory (SRAM) circuit 830; a direct memory access (DMA) circuit 832; and a display circuit 840 for coupling to one or more external displays. In one embodiment, the coprocessor(s) 820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 9:
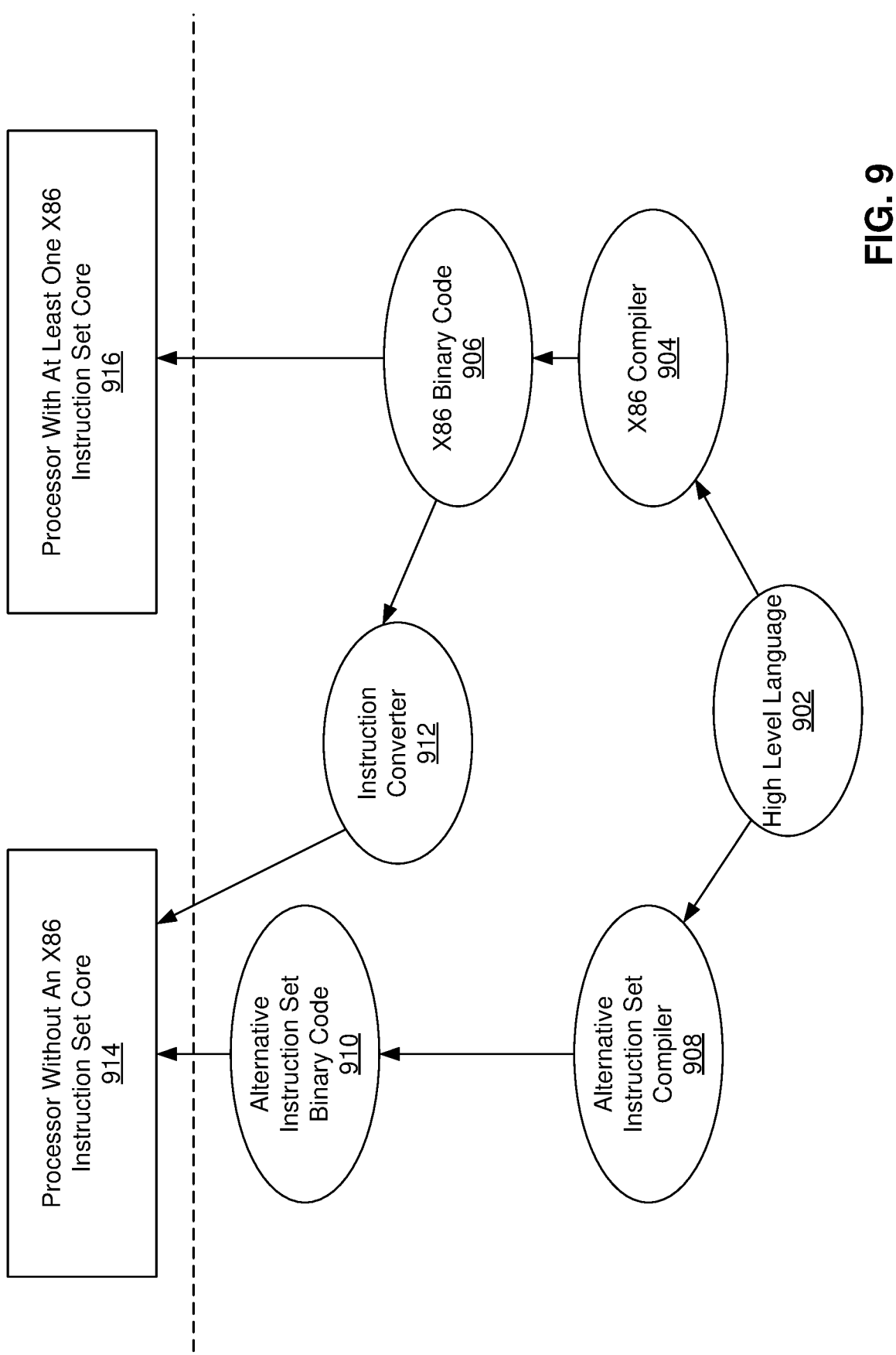
FIG. 9 is a block diagram contrasting the use of a software instruction converter to convert binary instructions in a source instruction set to binary instructions in a target instruction set according to embodiments of the invention.

FIG. 9 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 9 shows a program in a high level language 902 may be compiled using an x86 compiler 904 to generate x86 binary code 906 that may be natively executed by a processor with at least one x86 instruction set core 916. The processor with at least one x86 instruction set core 916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 904 represents a compiler that is operable to generate x86 binary code 906 (e.g., object code) that can, with or without additional linkage processing, be executed on the processor with at least one x86 instruction set core 916. Similarly, FIG. 9 shows the program in the high level language 902 may be compiled using an alternative instruction set compiler 908 to generate alternative instruction set binary code 910 that may be natively executed by a processor without at least one x86 instruction set core 914 (e.g., a processor with cores that execute the MIPS instruction set of MIPS Technologies of Sunnyvale, CA and/or that execute the ARM instruction set of ARM Holdings of Sunnyvale, CA). The instruction converter 912 is used to convert the x86 binary code 906 into code that may be natively executed by the processor without an x86 instruction set core 914. This converted code is not likely to be the same as the alternative instruction set binary code 910 because an instruction converter capable of this is difficult to make; however, the converted code will accomplish the general operation and be made up of instructions from the alternative instruction set. Thus, the instruction converter 912 represents software, firmware, hardware, or a combination thereof that, through emulation, simulation or any other process, allows a processor or other electronic device that does not have an x86 instruction set processor or core to execute the x86 binary code 906.

The following examples pertain to further embodiments.

In one example, an apparatus comprises: a first circuit to compact a plurality of data blocks to a compacted data block and to compact a plurality of ECCs associated with the plurality of data blocks to a compacted ECC; and a second circuit to generate a generated ECC for the compacted data block. The apparatus is to directly send the plurality of data blocks to a destination circuit without error detection on the plurality of data blocks based at least in part on the compacted ECC and the generated ECC.

In an example, the first circuit comprises N−1 XOR circuits to compact N of the plurality of data blocks.

In an example, the first circuit is to generate the compacted data block having X bits, wherein each of the plurality of data blocks has X bits.

In an example, the apparatus further comprises a comparator, where the apparatus is to directly send the plurality of data blocks to the destination circuit without the error detection when the comparator determines that the compacted ECC equals the generated ECC.

In an example, the apparatus further comprises an error detection circuit to perform the error detection on at least one of the plurality of data blocks when the compacted ECC does not equal the generated ECC.

In an example, the apparatus further comprises an error correction circuit coupled to the error detection circuit, where the error correction circuit is to correct at least one error in at least one of the plurality of data blocks based at least in part on the error detection.

In an example, the apparatus further comprises a control circuit to enable the first circuit and the second circuit in a first mode and to disable at least the first circuit in a second mode.

In an example, the control circuit is to disable the first circuit in the second mode in response to a BIOS setting.

In an example, the apparatus comprises a memory controller having the first circuit and the second circuit, the destination circuit comprising a core.

In an example, the memory controller comprises read path circuitry to receive the plurality of data blocks and the plurality of ECCs from a memory in response to a read request from the core.

In another example, a method comprises: compacting, in a memory controller, a plurality of data blocks received from a memory into a compacted data block, and compacting a plurality of ECCs associated with the plurality of data blocks into a compacted ECC; generating an ECC for the compacted data block; and based at least in part on the ECC and the compacted ECC, directly sending the plurality of data blocks to a destination circuit.

In an example, the method further comprises comparing the ECC to the compacted ECC and directly sending the plurality of data blocks to the destination circuit when the ECC matches the compacted ECC.

In an example, the method further comprises performing error detection on at least one of the plurality of data blocks and not directly sending the plurality of data blocks to the destination circuit when the ECC does not match the compacted ECC.

In an example, the method further comprises in response to detecting an error in at least one of the plurality of data blocks, performing error correction on the at least one data block and thereafter sending the plurality of data blocks to the destination circuit.

In an example, the method further comprises: compacting the plurality of data blocks and the plurality of ECCs in a first mode; and not compacting a second plurality of data blocks and a second plurality of ECCs in a second mode.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system comprises a processor having at least one core and a memory controller, where the memory controller is to: compact a plurality of data blocks to a compacted data block and compact a plurality of ECCs associated with the plurality of data blocks to a compacted ECC; generate a generated ECC for the compacted data block; and directly send the plurality of data blocks to a requester without error detection on the plurality of data blocks based at least in part on a comparison between the compacted ECC and the generated ECC. The system may further include a memory coupled to the processor, where the memory is to send the plurality of data blocks to the memory controller in response to a read request.

In an example, the memory is further to send the plurality of ECCs to the memory controller in response to the read request, each of the plurality of data blocks comprising X bits and each of the plurality of ECCs comprising Y bits, Y less than X.

In an example, the memory controller is to compact the plurality of data blocks to the compacted data block having X bits and compact the plurality of ECCs to the compacted ECC having Y bits.

In an example, the memory controller is to: directly send the plurality of data blocks to the requester without error detection when the compacted ECC equals the generated ECC; and perform the error detection on the plurality of data blocks when the compacted ECC does not equal the generated ECC.

In an example, the memory controller is to correct at least one error in at least one of the plurality of data blocks based at least in part on the error detection.

In another example, an apparatus comprises: means for compacting a plurality of data blocks received from a memory into a compacted data block, and for compacting a plurality of ECCs associated with the plurality of data blocks into a compacted ECC; means for generating an ECC for the compacted data block; and means for directly sending the plurality of data blocks to a destination means without error detection on the plurality of data blocks based at least in part on the generated ECC and the compacted ECC.

In an example, the apparatus further comprises means for comparing the ECC to the compacted ECC.

In an example, the apparatus further comprises means for performing error detection on at least one of the plurality of data blocks when the ECC does not match the compacted ECC.

In an example, the apparatus further comprises means for performing error correction on at least one data block.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic.

While the present disclosure has been described with respect to a limited number of implementations, those skilled in the art, having the benefit of this disclosure, will appreciate numerous modifications and variations therefrom. It is intended that the appended claims cover all such modifications and variations.

APPENDIX A

The following Proof is to show the technical correctness of: ECC-XORed=ECC-Generated according to embodiments herein.

Proof:

| Symbol | Meaning | |
|---|---|---|
| XOR | Bitwise "exclusive or" operation | |
| $Data_i$ | The $i^{th}$ data block | any $i \in \{1, 2, 3, \ldots N\}$ |
| $Data_{i,j0}$ | The $j0^{th}$ bit of the $i^{th}$ data block | |
| $Data_{i,j1}$ | The $j1^{th}$ bit of the $i^{th}$ data block | |
| ... | ... | |
| $ECC_i$ | The whole ECC code of the $i^{th}$ data block | |
| $ECC_{i,j}$ | The $j^{th}$ bit of the ECC of the $i^{th}$ data block | |
| $Data_{N+1}$ | Data-XORed (the compacted data block) | |
| $ECC_{N+1}$ | ECC-Generated (the ECC of the compacted data block) | |

For most ECC schemes, e.g., Hamming code scheme, the creation of ECC bit is done by XORing a certain combination of the data bits, so for the $j^{th}$ bit of ECC of $i^{th}$ data block, we have:

$$ECC_{1,j} = XOR(Data_{1,j0}, Data_{1,j1}, \ldots) \qquad (1)$$

$$ECC_{2,j} = XOR(Data_{2,j0}, Data_{2,j1}, \ldots) \qquad (2)$$

$$\ldots$$

$$ECC_{i,j} = XOR(Data_{i,j0}, Data_{i,j1}, \ldots) \qquad (3)$$

$$\ldots$$

$$ECC_{N,j} = XOR(Data_{N,j0}, Data_{N,j1}, \ldots) \qquad (4)$$

$$ECC_{N+1,j} = XOR(Data_{N+1,j0}, Data_{N+1,j1}, \ldots) \qquad (5)$$

Because we derive $Data_{N+1}$=XOR($Data_1$, $Data_2$, . . . , $Data_N$) by applying XORs on the N data blocks, we have:

$$Data_{N+1,j0} = XOR(Data_{1,j0}, Data_{2,j0}, \ldots, Data_{N,j0}) \qquad (6)$$

$$Data_{N+1,j1} = XOR(Data_{1,j1}, Data_{2,j1}, \ldots, Data_{N,j1}) \qquad (7)$$

Put (6) and (7) to (5), then we have:

$$ECC_{N+1,j} = XOR\{XOR(\text{Data}_{1,j0}, \text{Data}_{2,j0}, \ldots, \text{Data}_{N,j0}), \quad (8)$$
$$XOR(\text{Data}_{1,j1}, \text{Data}_{2,j1}, \ldots, \text{Data}_{N,j1}), \ldots\} =$$
$$XOR\{XOR(\text{Data}_{1,j0}, \text{Data}_{1,j1}, \ldots),$$
$$XOR(\text{Data}_{2,j0}, \text{Data}_{2,j1}, \ldots), \ldots, XOR(\text{Data}_{N,j0}, \text{Data}_{N,j1})\}$$

Put (1), (2), (3), (4) to (8), then we have:

$$ECC_{N+1,j} = XOR(ECC_{1,j}, ECC_{2,j}, \ldots) = \text{the } j^{th} \text{ bit of ECC-XORed}$$

So we have:

$$ECC_{N+1} = ECC\text{-XORed}$$

Because of $ECC_{N+1}$=ECC-Generated (defined in the table), the proof is completed:

$$ECC\text{-XORed} = ECC\text{-Generated}$$

APPENDIX B

For Hamming code SEC-DED scheme, an X-bit data block associates with a Y-bit ECC code. The equation below determines the Y for a given X (X, typically, is much greater than Y):

$$Y = \lceil \log_2(X + Y) \rceil \cong \log_2 X$$

"⌈X⌉" is a celling function that maps X to the least integer greater than or equal to X, e.g., ⌈2.6⌉=3. To generate the ECC, the binary code in Y-bit width of the position number is XORed where the data bit is '1'. Because the average number of '1' of an X-bit data block is X/2, the number of XORs is:

$$\frac{X}{2} * Y \cong \frac{X}{2} * \log_2 X$$

The number of XORs over all the data bits for an additional parity bit is: X−1. So a total number of XORs for generating the ECC is about:

$$R \cong \frac{X}{2} * \log_2 X + (X - 1)$$
$$\cong \frac{X}{2} * \log_2 X + X$$

Then we have: $X \cong (2R/(\log_2 X + 2))$.

What is claimed is:

1. An apparatus comprising:
a first circuit to compact a plurality of data blocks to a compacted data block and to compact a plurality of error correction codes (ECCs) associated with the plurality of data blocks to a compacted ECC; and
a second circuit to generate a generated ECC for the compacted data block, wherein the apparatus is to directly send the plurality of data blocks to a destination circuit without error detection on the plurality of data blocks based at least in part on the compacted ECC and the generated ECC.

2. The apparatus of claim 1, wherein the first circuit comprises N−1 exclusive-OR (XOR) circuits to compact N of the plurality of data blocks.

3. The apparatus of claim 2, wherein the first circuit is to generate the compacted data block having X bits, wherein each of the plurality of data blocks has X bits.

4. The apparatus of claim 1, further comprising a comparator, wherein the apparatus is to directly send the plurality of data blocks to the destination circuit without the error detection when the comparator determines that the compacted ECC equals the generated ECC.

5. The apparatus of claim 4, further comprising an error detection circuit to perform the error detection on at least one of the plurality of data blocks when the compacted ECC does not equal the generated ECC.

6. The apparatus of claim 5, further comprising an error correction circuit coupled to the error detection circuit, wherein the error correction circuit is to correct at least one error in at least one of the plurality of data blocks based at least in part on the error detection.

7. The apparatus of claim 1, further comprising a control circuit to enable the first circuit and the second circuit in a first mode and to disable at least the first circuit in a second mode.

8. The apparatus of claim 7, wherein the control circuit is to disable the first circuit in the second mode in response to a basic input/output system (BIOS) setting.

9. The apparatus of claim 1, wherein the apparatus comprises a memory controller having the first circuit and the second circuit, the destination circuit comprising a core.

10. The apparatus of claim 9, wherein the memory controller comprises read path circuitry to receive the plurality of data blocks and the plurality of ECCs from a memory in response to a read request from the core.

11. A method comprising:
compacting, in a memory controller, a plurality of data blocks received from a memory into a compacted data block, and compacting a plurality of error correction codes (ECCs) associated with the plurality of data blocks into a compacted ECC;
generating an ECC for the compacted data block; and
based at least in part on the ECC and the compacted ECC, directly sending the plurality of data blocks to a destination circuit.

12. The method of claim 11, further comprising comparing the ECC to the compacted ECC and directly sending the plurality of data blocks to the destination circuit when the ECC matches the compacted ECC.

13. The method of claim 12, further comprising performing error detection on at least one of the plurality of data blocks and not directly sending the plurality of data blocks to the destination circuit when the ECC does not match the compacted ECC.

14. The method of claim 13, further comprising in response to detecting an error in at least one of the plurality of data blocks, performing error correction on the at least one data block and thereafter sending the plurality of data blocks to the destination circuit.

15. The method of claim 11, further comprising:
compacting the plurality of data blocks and the plurality of ECCs in a first mode; and
not compacting a second plurality of data blocks and a second plurality of ECCs in a second mode.

16. A system comprising:
a processor having at least one core and a memory controller, wherein the memory controller is to:
compact a plurality of data blocks to a compacted data block and compact a plurality of error correction codes (ECCs) associated with the plurality of data blocks to a compacted ECC;
generate a generated ECC for the compacted data block; and
directly send the plurality of data blocks to a requester without error detection on the plurality of data blocks based at least in part on a comparison between the compacted ECC and the generated ECC; and
a memory coupled to the processor, wherein the memory is to send the plurality of data blocks to the memory controller in response to a read request.

17. The system of claim 16, wherein the memory is further to send the plurality of ECCs to the memory controller in response to the read request, each of the plurality of data blocks comprising X bits and each of the plurality of ECCs comprising Y bits, Y less than X.

18. The system of claim 17, wherein the memory controller is to compact the plurality of data blocks to the compacted data block having X bits and compact the plurality of ECCs to the compacted ECC having Y bits.

19. The system of claim 16, wherein the memory controller is to:
directly send the plurality of data blocks to the requester without error detection when the compacted ECC equals the generated ECC; and
perform the error detection on the plurality of data blocks when the compacted ECC does not equal the generated ECC.

20. The system of claim 19, wherein the memory controller is to correct at least one error in at least one of the plurality of data blocks based at least in part on the error detection.

* * * * *